(12) United States Patent
Watanabe

(10) Patent No.: US 7,561,811 B1
(45) Date of Patent: Jul. 14, 2009

(54) METHOD, DEVICE, AND SYSTEM FOR REGENERATION AND APPLICATION OF OPTICAL CLOCK

(75) Inventor: Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/560,723

(22) Filed: Apr. 28, 2000

(30) Foreign Application Priority Data

May 14, 1999 (JP) ................................. 11-133423

(51) Int. Cl.
*H04B 10/04* (2006.01)
(52) U.S. Cl. ...................................... 398/201; 398/180
(58) Field of Classification Search ................ 359/176, 359/326, 158, 179, 128, 127, 244; 385/122, 385/15, 1, 27; 372/6, 25, 18; 398/154, 180, 398/201
See application file for complete search history.

(56) References Cited

U.S. PATENT DOCUMENTS

| | | | | |
|---|---|---|---|---|
| 5,323,260 | A | * | 6/1994 | Alfano et al. ................ 359/244 |
| 5,369,520 | A | * | 11/1994 | Avramopoulos et al. ..... 359/176 |
| 5,596,667 | A | * | 1/1997 | Watanabe .................... 385/122 |
| 5,777,766 | A | * | 7/1998 | Fontana et al. .............. 398/154 |
| 5,796,765 | A | | 8/1998 | Lucek et al. .................. 372/25 |
| 6,307,984 | B1 | * | 10/2001 | Watanabe .................... 385/24 |

FOREIGN PATENT DOCUMENTS

| | | |
|---|---|---|
| EP | 0 788 016 A1 | 8/1997 |
| JP | 09321372 A | * 12/1997 |
| WO | WO 9808138 A1 | * 2/1998 |

OTHER PUBLICATIONS

Bigo, S. and E. Desurvire. "20 GHz all-optical clock recovery based on fiber laser mode-locking with fiber nonlinear loop mirror as variable intensity/phase modulator." Electronics Letters, vol. 31, No. 21, Oct. 12, 1995: 1855-1856.*

Bigo, S. et al. "All-optical regenerator for 20 Gbit/s transoceanic transmission." Electronics Letters, vol. 33, No. 11, May 22, 1997: 975-976.*

Bigo, S. et al. "All-optical fiber signal processing and regeneration for soliton communications." IEEE Journal on Selected Topics in Quantum Electronics, vol. 3, No. 5, Oct. 1997: 1208-1223.*

(Continued)

*Primary Examiner*—Leslie Pascal
(74) *Attorney, Agent, or Firm*—Staas & Halsey LLP

(57) ABSTRACT

An optical device for regenerating an optical clock, including an optical path provided between an input port to which signal light modulated at a frequency $f_s$ is supplied and an output port, and an optical loop optically coupled to the optical path. The optical loop includes an optical amplifier for compensating for a loss in the optical loop so that laser oscillation occurs in the optical loop, an adjuster for adjusting the optical path length of the optical loop so that the frequency $f_s$ becomes equal to an integral multiple of the reciprocal of a recirculation period of the optical loop, and a nonlinear optical medium for mode-locking the laser oscillation according to the signal light.

27 Claims, 6 Drawing Sheets

OTHER PUBLICATIONS

Ellis, A.D. et al. "All optical clock recovery at bit rates up to 40 Gbit/s." Electronics Letters, vol. 29, No. 15, Jul. 22, 1993: 1323-1324.*

Obro, M. et al. "All-optical frame synchronisation recovery." Electronics Letters, vol. 30, No. 15, Jul. 21, 1994: 1243-1244.*

Pastel, D.A. et al. "High nonlinearity, low loss fiber for 1 pJ switching of 8-ps optical pulses." Conference on Optical Fiber Communication. OFC 97., Feb. 16-21, 1997: 168-169.*

Patrick, D.M. and R.J. Manning. "20 Gbit/s all-optical clock recovery using semiconductor nonlinearity." Electronics Letters, vol. 30, No. 2, Jan. 20, 1994: 151-152.*

Watanabe, S. et al. "Simultaneous wavelength conversion and optical phase conjugation of 200 Gb/s (5×40 Gb/s) WDM signal using a highly nonlinear fiber four-wave mixer." ECOC 97, Conf. Pub. No. 448, vol. 5, Sep. 22-25, 1997: 1-4.*

Ramaswami, R. and K.N. Sivarajan. Optical Networks: A Practical Perspective. San Francisco, California: Morgan Kaufmann Publishers, Inc., 1998.*

Greer, E.J. et al. "All-optical FM mode-locking of fibre laser." Electronics Letters, vol. 28, No. 18, Aug. 27, 1992: 1741-1743.*

Ramaswami, R. and K.N. Sivarajan. Optical Networks: A Practical Perspective. San Francisco, California: Morgan Kaufmann Publishers, Inc., 1998. cited in previous Office Action mailed on Oct. 19, 2004. presently cited for transmitting additional pages.*

Onishi, M. et al. "Highly nonlinear dispersion shifted fiber and its application tobroadband wavelength converter." 11th International Conference on Integrated Optics and Optical Fibre Communications, and 23rd European Conference on Optical Communications (Conf. Publ. No. 448). Sep. 22-25, 1997: 115-118.*

"All-Optical Clock Recovery Using A Mode-Locked Laser," K. Smith, et al., Electronics Letters, Sep. 10, 1992, vol. 28, No. 19, pp. 1814-1816.

"10Gbit/s All Optical Regenerator," W. A. Pender, et al., Electronics Letters, Aug. 31, 1995, vol. 31, No. 18, pp. 1587-1588.

"All Optical Clock Recovery Using A Mode-Locked Laser" by Smith et al., Electronics letters, Sep. 10, 1992, vol. 28, No. 19.

"10 Gbit/s All Optical Regenerator", Pender et al., Electronic Letters, Aug. 31, 1995, vol. 31, No. 18.

European Search Report dated Aug. 28, 2003.

* cited by examiner

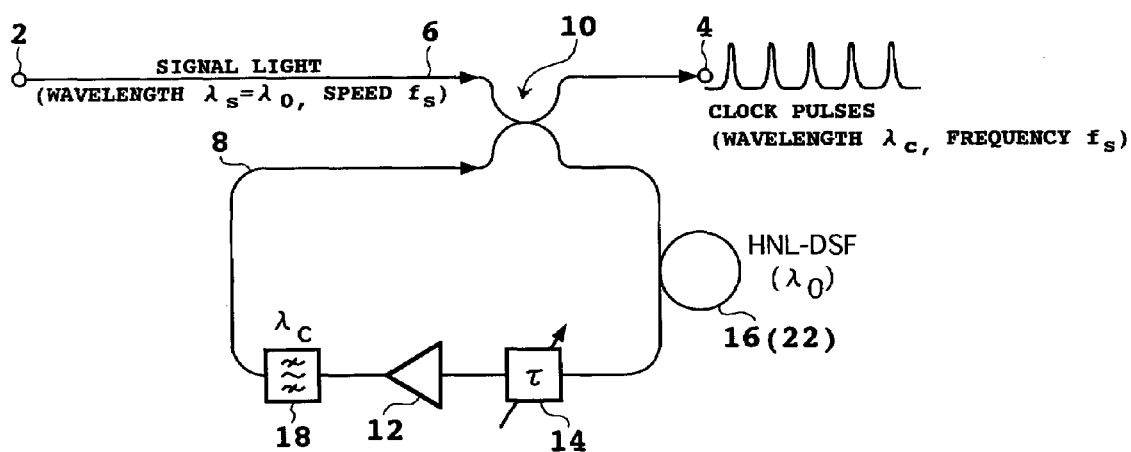
F I G. 3

METHOD, DEVICE, AND SYSTEM FOR REGENERATION AND APPLICATION OF OPTICAL CLOCK

BACKGROUND OF THE INVENTION

1. Field of the Invention

The present invention relates to a method, device, and system for regeneration and application of an optical clock.

2. Description of the Related Art

This application is related to U.S. application Ser. Nos. 09/217,018, 09/386,847 and 09/456,821, which are incorporated herein by reference.

A mode-locked laser (MLL) is one of the most general high-quality laser light sources, and it is broadly classified into an active mode-locked laser and a passive mode-locked laser. The active mode-locked laser is of a type such that amplitude modulation (AM) or frequency modulation (FM) is added under laser oscillation conditions to thereby oscillate pulse light synchronous with the modulation. On the other hand, the passive mode-locked laser is of a type such that such modulation is not added, but external pulse light is input to generate pulse light having a shorter pulse duration in response to the external input pulse light. Each type of mode-locked laser is most generally used as a short-pulse light source.

The present invention provides an active mode-locked laser in which external signal light (general signal light used in optical communication) is added to oscillate continuous pulse light synchronous with a fundamental frequency (modulation frequency) of the signal light. The continuous pulse light is output as an optical clock. Thus, the active mode-locked laser according to the present invention can be used not only as a high-quality pulse light source, but also as an optical clock regenerator in an optical repeater.

Conventionally known is a device for regenerating an optical clock so configured that input signal light is once converted into an electrical signal by a photodetector such as a photodiode, that a fundamental frequency is electrically extracted according to the converted electrical signal, and that laser light is intensity-modulated at this fundamental frequency to thereby obtain the optical clock. This kind of device is applied to a regenerative repeater in optical fiber communication, for example. However, the operating speed of this device is limited by an electrical circuit related to signal processing, so that the bit rate of applicable input signal light is limited by the electrical circuit.

Further, another optical clock regenerator employing an active mode-locked laser with an optical modulator (LN (lithium niobate) modulator, EA (electroabsorption) modulator, etc.) inserted therein is also known. In this optical clock regenerator, the optical modulator is modulated at a fundamental frequency electrically regenerated as similarly to the above to regenerate clock pulses.

In any prior art technique mentioned above, it is necessary to perform opto/electric conversion such that signal light is converted into an electrical signal to regenerate an optical clock, and the operation of the device is dependent on the bit rate, pulse shape, etc. of signal light.

SUMMARY OF THE INVENTION

It is therefore an object of the present invention to provide a method, device, and system for regeneration and application of an optical clock not depending on the bit rate, pulse shape, etc. of signal light without the need for opto/electric conversion.

In accordance with a first aspect of the present invention, there is provided an optical device comprising an optical path provided between an input port and an output port, and an optical loop optically coupled to the optical path. Signal light modulated at a frequency $f_s$ is supplied to the input port. The optical loop comprises an optical amplifier for compensating for a loss in the optical loop so that laser oscillation occurs in the optical loop, an adjuster for adjusting the optical path length of the optical loop so that the frequency $f_s$ becomes equal to an integral multiple of the reciprocal of a recirculation period of the optical loop, and a nonlinear optical medium for mode-locking the laser oscillation in the optical loop according to the signal light.

For example, the nonlinear optical medium comprises a third-order nonlinear optical medium. In this case, amplitude modulation, for example, is performed in the nonlinear optical medium by four-wave mixing using the signal light as pump light, thereby mode-locking the laser oscillation in the optical loop. As a result, an optical clock is regenerated at a frequency equal to the modulation frequency $f_s$ of the signal light.

According to the first aspect of the present invention, the optical clock can be regenerated without the need for opto/electric conversion and the dependence on the bit rate, pulse shape, etc. of the signal light.

In accordance with a second aspect of the present invention, the optical device further comprises a waveform shaper optically connected to the output port for performing waveform shaping of the signal light according to an optical clock output from the output port. The waveform shaper may be provided by a nonlinear optical loop mirror, for example.

According to the second aspect of the present invention, the waveform shaping can be easily performed according to the optical clock regenerated without the need for opto/electric conversion.

In accordance with a third aspect of the present invention, there is provided a system comprising an optical fiber transmission line for transmitting signal light and an optical device connected to an output end of the optical fiber transmission line. The optical device in this system may be provided by the optical device according to the first or second aspect of the present invention.

In accordance with a fourth aspect of the present invention, there is provided a system comprising an optical fiber transmission line for transmitting signal light and at least one optical repeater arranged along the optical fiber transmission line. Each of the at least one optical repeater comprises an optical clock regenerator for regenerating an optical clock by mode locking of laser oscillation according to the signal light, and a waveform shaper for performing waveform shaping of the signal light according to the optical clock regenerated by the optical clock regenerator.

In accordance with a fifth aspect of the present invention, there is provided a method comprising the steps of (a) generating laser oscillation in an optical loop including a nonlinear optical medium; (b) introducing signal light modulated at a frequency $f_s$ into said optical loop; (c) adjusting the optical path length of said optical loop so that said frequency $f_s$ becomes equal to an integral multiple of the reciprocal of a recirculation period of said optical loop; and (d) regenerating an optical clock by mode-locking said laser oscillation according to said signal light.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 3 is a block diagram showing a third preferred embodiment of the optical device according to the present invention;

DETAILED DESCRIPTION OF THE PREFERRED EMBODIMENTS

Some preferred embodiments of the present invention will now be described in detail with reference to the attached drawings.

Figure 1:
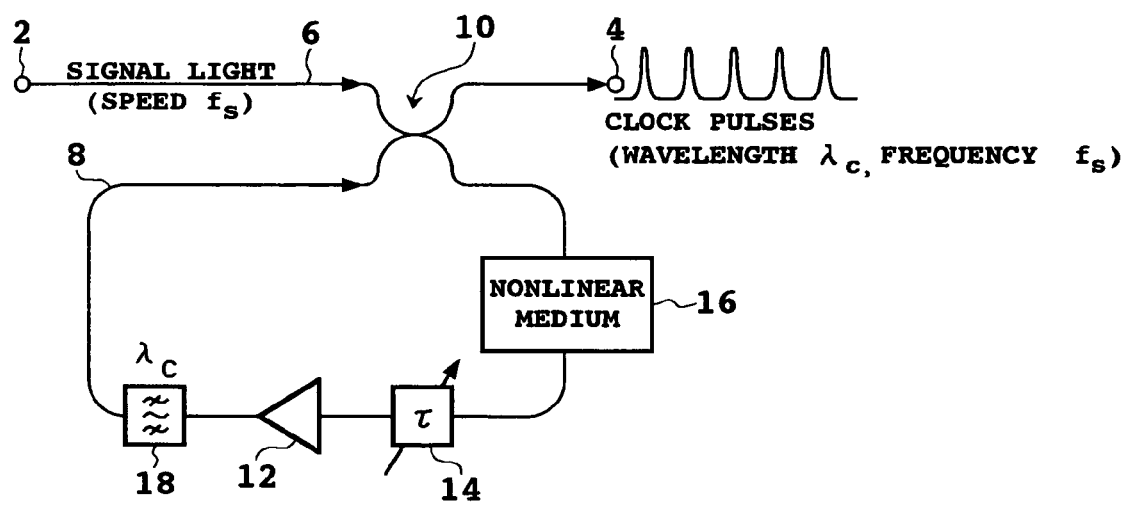
FIG. 1 is a block diagram showing a first preferred embodiment of the optical device according to the present invention.

FIG. 1 is a block diagram showing a first preferred embodiment of the optical device according to the present invention. This optical device includes an optical path 6 provided between an input port 2 and an output port 4, and an optical loop 8 optically coupled to the optical path 6. Each of the optical path 6 and the optical loop 8 is provided by an optical fiber, for example. In this case, the optical coupling between the optical path 6 and the optical loop 8 may be made by a fiber fusion type optical coupler 10. Accordingly, a part of the optical path 6 and a part of the optical loop 8 are provided by the optical coupler 10.

The optical loop 8 includes an optical amplifier 12 for compensating for a loss in the optical loop 8 so that laser oscillation occurs in the optical loop 8, an adjuster 14 configured by a delay circuit having a variable delay time $\tau$, and a nonlinear medium (nonlinear optical medium) 16. Particularly in this preferred embodiment, the optical loop 8 further includes an optical bandpass filter 18 having a passband including a wavelength $\lambda_c$ of the laser oscillation.

Signal light modulated at a frequency $f_s$ is supplied to the input port 2, and a part of the supplied signal light is introduced through the optical coupler 10 into the optical loop 8. The optical path length L of the optical loop 8 is preliminarily adjusted by the adjuster 14 so that the modulation frequency $f_s$ of the signal light becomes equal to an integral multiple of the reciprocal $\Delta v = c/L$ (c: light velocity) of a recirculation period of the optical loop 8. The optical amplifier 12 may be provided by an EDFA (erbium doped fiber amplifier), for example.

Particularly in this preferred embodiment, the nonlinear medium 16 is provided by a third-order nonlinear medium. Without a signal input, a continuous wave at wavelength of $\lambda_c$ is lased from the optical loop 8. When the signal light is introduced into the nonlinear medium 16, the lasing wave (CW) is amplitude-modulated (AM) or frequency-modulated (FM) in the nonlinear medium 16, and then mode-locked to the frequency of $f_s$. As a result, clock pulses (optical clock) having a wavelength $\lambda_c$ and a frequency $f_s$ are generated or regenerated, and the clock pulses are output through the optical coupler 10 from the output port 4. This will now be described more specifically.

Continuous wave (CW) laser light having a wavelength $\lambda_c$ is preliminarily oscillated by a ring laser configured by the optical loop 8, and signal light having a wavelength $\lambda_s$ and a frequency (bit rate or speed) $f_s$ is input into the optical loop 8. At this time, four-wave mixing (FWM) employing this signal light as pump light (excitation light) is generated in the nonlinear medium 16, so that the CW light having the wavelength $\lambda_c$ is amplitude-modulated by the signal light. The amplitude-modulated CW light includes a component of the fundamental frequency $f_s$. Accordingly, by setting the optical path length of the optical loop 8 as mentioned above, clock pulses having a frequency $f_s$ are generated.

Thus, clock pulses can be obtained without the need for opto/electric conversion in this preferred embodiment, so that it is possible to provide an all-optical clock regenerator not depending on the bit rate, pulse shape, etc. of signal light.

The nonlinear medium 16 may be provided by a semiconductor optical amplifier (SOA), a single-mode fiber, or a dispersion shifted fiber (DSF). It is effective to use a highly-nonlinear DSF (HNL-DSF) having high nonlinear effects as the DSF.

Figure 2:
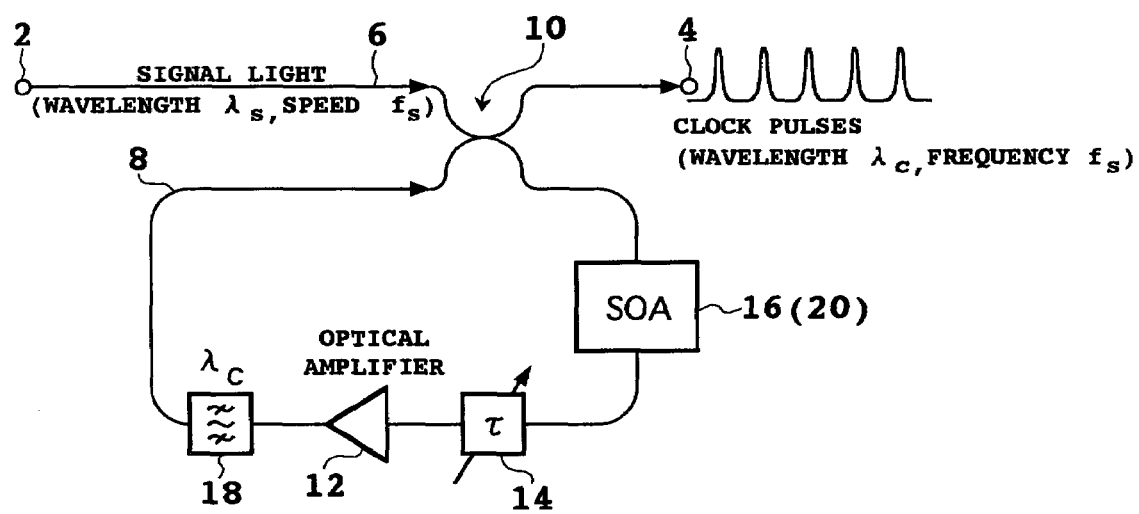
FIG. 2 is a block diagram showing a second preferred embodiment of the optical device according to the present invention.

FIG. 2 shows a second preferred embodiment of the optical device according to the present invention using an SOA 20 as the nonlinear medium 16, and FIG. 3 shows a third preferred embodiment of the optical device according to the present invention using an HNL-DSF 22 as the nonlinear medium 16. In the case of using the SOA 20 as the nonlinear medium 16 as shown in FIG. 2, gain is generated in the nonlinear medium 16. Accordingly, the optical amplifier 12 for maintaining the laser oscillation in the optical loop 8 may be eliminated. More generally, in the case that the linear or nonlinear gain in the nonlinear medium 16 is sufficiently large, the optical amplifier 12 may be eliminated.

In the case that the HNL-DSF 22 is used as the nonlinear medium 16 as shown in FIG. 3, the wavelength $\lambda_s$ of signal light is preferably set substantially equal to the zero-dispersion wavelength $\lambda_0$ of the HNL-DSF 22, so as to most efficiently generate FWM in the nonlinear medium 16. With this setting, optimum phase matching can be attained, and a broadest conversion band and a maximum conversion efficiency can be obtained. The term of "conversion" used herein means conversion from signal light to clock pulses. Further, by managing the zero-dispersion wavelength $\lambda_0$ of the HNL-DSF 22 to a constant value with high accuracy, the conversion band can be broadened. This will now be described more specifically.

The nonlinear coefficient $\alpha$ of a usual DSF is as small as about 2.6 $W^{-1}km^{-1}$. Therefore, to obtain a sufficient conversion efficiency in the case of using such a usual DSF as the nonlinear medium 16 for generating FWM, the fiber is required to have a length of 10 km or more. It is accordingly desired to provide a DSF (HNL-DSF as mentioned above) having a large nonlinear coefficient $\gamma$ enough to reduce the fiber length. If the length of a DSF used as the nonlinear medium 16 for generating FWM can be reduced, the zero-dispersion wavelength of the DSF can be managed with high accuracy, thereby facilitating exact matching of the wavelength of signal light to the zero-dispersion wavelength of the DSF. As a result, a broad conversion band can be obtained.

In increasing the nonlinear coefficient $\gamma$, increasing the nonlinear refractive index $n_2$ or decreasing a mode field diameter (MFD) corresponding to the effective core area $A_{eff}$ is effective. Increasing the nonlinear refractive index $n_2$ can be effected by doping the cladding with fluorine or the like or by doping the core with a high concentration of $GeO_2$, for example. By doping the core with 25-30 mol % of $GeO_2$, a large value of $5 \times 10^{-20}$ m²/W or more is obtained as the nonlinear refractive index $n_2$ (in comparison, about $3.2 \times 10^{-20}$ m²/W for a normal silica fiber). Decreasing the MFD can be effected by suitably setting a relative index difference $\Delta$ or by suitably designing the core shape. For example, by doping the core with 25-30 mol % of $GeO_2$ and setting the relative index difference $\Delta$ to 2.5-3.0%, a small value of less than 4 μm is obtained as the MFD. As the total effect, a large value of 15 $W^{-1}km^{-1}$ or more is obtained as the nonlinear coefficient $\gamma$.

Another important factor to be considered is that the DSF providing such a large value as the nonlinear coefficient $\alpha$ must have a zero-dispersion wavelength substantially coinciding with the wavelength of signal light. Such coincidence between the zero-dispersion wavelength and the wavelength of signal light can be attained by setting the fiber parameters (e.g., relative index difference $\Delta$ and MFD) in the following manner. When the relative index difference $\Delta$ in a normal optical fiber is increased with the MFD fixed, the dispersion is increased in a normal dispersive region. On the other hand, the larger the core diameter, the smaller the dispersion, while the smaller the core diameter, the larger the dispersion. Accordingly, zero dispersion for signal light can be obtained by first setting the MFD to a certain value adapted to the band of the signal light and thereafter adjusting the core diameter so that the zero-dispersion wavelength coincides with a predetermined wavelength of the signal light.

A conversion efficiency $\eta_c$ in an optical fiber having a length L and a loss $\alpha$ can be approximated by the following equation.

$$\eta_c = \exp(-\alpha L)(\gamma P_p L)^2 \quad (1)$$

where $P_p$ is the average pump light power (signal light power). Accordingly, as compared with a normal DSF having a nonlinear coefficient $\gamma$ of 2.6 $W^{-1}km^{-1}$, a fiber having a nonlinear coefficient $\gamma$ of 15 $W^{-1}km^{-1}$ can achieve the same conversion efficiency with a length smaller by $2.6/15 \approx 1/5.7$. In such a normal DSF, a fiber length of about 10 km is required as mentioned above to obtain a sufficiently large conversion efficiency. To the contrary, in such an HNL-DSF having a large nonlinear coefficient $\gamma$ as mentioned above, a similar conversion efficiency can be obtained with a smaller length of about 1-2 km. In actual, the loss is also reduced by an amount corresponding to the reduction in the fiber length, so that the fiber length can be further reduced to obtain the same conversion efficiency. In such a shorter DSF, the controllability of the zero-dispersion wavelength is improved and therefore the wavelength of the signal light can be made to exactly coincide with the zero-dispersion wavelength, thus obtaining a broad conversion band. Furthermore, when the fiber length is several kilometers, a polarization plane maintaining ability is ensured, so that the use of such an HNL-DSF is greatly effective in achieving a high conversion efficiency and a broad conversion band and in eliminating polarization dependence.

However, the zero-dispersion wavelength of an actual optical fiber varies along its length because of problems in a manufacturing technique for the optical fiber, with the result that the phase matching condition is deviated from the ideal condition, causing limitation of the conversion band. However, by cutting an optical fiber into a plurality of small sections and then connecting, e.g., splicing the small sections in such an order that the adjacent ones of the small sections have similar zero-dispersion wavelengths (in an order different from the initial order counted from an end of the optical fiber), an optical fiber having a broad conversion band can be obtained with the average of chromatic dispersions over the entire fiber length being unchanged.

Alternatively, a broad conversion band can be obtained by preparing a plurality of fibers each having a length (e.g., hundreds of meters or less) allowing dispersion management with a high accuracy so required as to obtain a sufficiently broad conversion band, then combining and splicing some of the fibers having required zero-dispersion wavelengths to obtain a fiber having a length required to obtain a required conversion efficiency, and providing a nonlinear medium by use of this fiber.

In the case of broadening the conversion band as mentioned above, it is effective to gather the fiber portions having smaller variations in zero-dispersion a wavelength near a pump light (signal light) input end of a nonlinear optical medium, because the power of pump light is higher near the pump light input end. Further, the conversion band can be further broadened by increasing the number of fiber sections as required and/or by alternately arranging the positive and negative signs of dispersion at a portion distant from the pump light input end.

In dividing an optical fiber into a plurality of sections as mentioned above, an index of determining whether or not the length of each section is sufficiently small may be based on the nonlinear length. It can be considered that phase matching in FWM in a fiber having a length sufficiently smaller than the nonlinear length is dependent on the average dispersion of the fiber. As an example, in FWM using a pump light power of about 30 mW in a fiber having a nonlinear coefficient $\gamma$ of 2.6 $W^{-1}km^{-1}$, the nonlinear length becomes about 12.8 km, so that the above-mentioned index is equal to about 1/10 of this length, i.e., about 1 km. As another example, in FWM using a pump light power of about 30 mW in a fiber having a nonlinear coefficient $\gamma$ of 15 $W^{-1}km^{-1}$, the nonlinear length becomes about 2.2 km, so that the above-mentioned index is equal to about 1/10 of this length, i.e., about 200 m. In any case, by measuring the average zero-dispersion wavelengths of fibers each having a length sufficiently smaller than the nonlinear length, and combining the fibers having substantially the same average zero-dispersion wavelength to provide a nonlinear medium, the conversion efficiency can be increased and the conversion band can be broadened.

The dispersion of the HNL-DSF 22 is preferably set so that no walk-off of two pulses (one of the pulses of the signal light and one of the clock pulses) is generated. As an example, the zero-dispersion wavelength of the HNL-DSF 22 is set near the middle between the wavelength of the signal light and the wavelength of the clock pulses. Alternatively, the zero-dispersion wavelength is set longer or shorter than the wavelengths of the two pulses. In the case that the zero-dispersion wavelength is set longer than the wavelengths of the two pulses, the dispersion of the HNL-DSF 22 falls in a normal dispersive region, so that modulation instability effects can be suppressed. In the case that the zero-dispersion wavelength is set shorter than the wavelengths of the two pulses, the dispersion of the HNL-DSF 22 falls in an anomalous dispersive region, so that solution effects can be used. How the zero-dispersion wavelength is set may be determined according to actual system conditions.

In the case of using the HNL-DSF 22 as the nonlinear medium 16 and requiring suppression of stimulated Brillouin scattering (SBS) due to high signal light power, it is desirable to frequency-modulate or phase-modulate the signal light at a frequency sufficiently lower than the bit rate of the signal.

Figure 4:
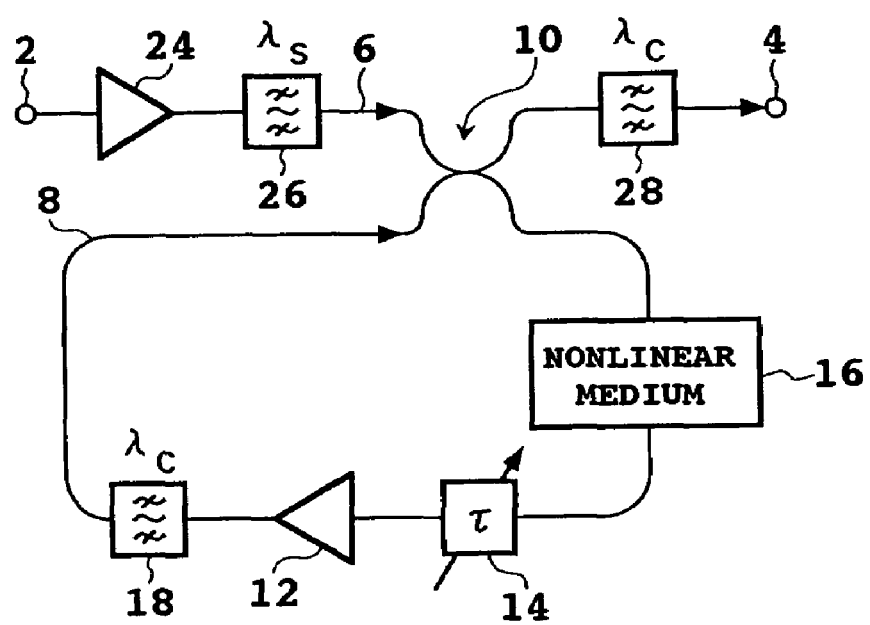
FIG. 4 is a block diagram showing a fourth preferred embodiment of the optical device according to the present invention.

FIG. 4 is a block diagram showing a fourth preferred embodiment of the optical device according to the present invention. In this preferred embodiment, an optical amplifier 24 is connected between the input port 2 and the optical coupler 10, so as to increase the power of signal light to thereby increase the efficiency of FWM in the nonlinear medium 16. The optical amplifier 24 is provided by an EDFA, for example. Further, an optical bandpass filter 26 is provided between the optical amplifier 24 and the optical coupler 10, so as to remove amplified spontaneous emission (ASE) noise added in the optical amplifier 24. The filter 26 has a passband including the wavelength $\lambda_s$ of the signal light.

Further, an optical bandpass filter 28 is provided between the optical coupler 10 and the output port 4, so as to extract regenerated clock pulses. The filter 28 has a passband including the wavelength $\lambda_c$ of the clock pulses. By using the filter 28, the signal light can be removed in the filter 28 to thereby output only the obtained clock pulses from the output port 4.

Figure 5:
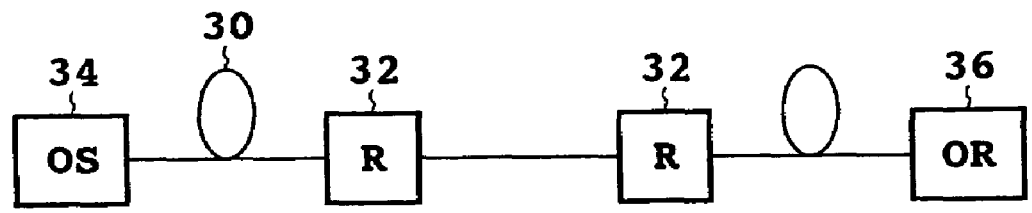
FIG. 5 is a block diagram showing a preferred embodiment of the system according to the present invention.

FIG. 5 is a block diagram showing a preferred embodiment of the system according to the present invention. This system includes an optical fiber transmission line 30 for transmitting signal light, and a plurality of optical repeaters (R) 32 (two being shown) arranged along the optical fiber transmission line 30. A single optical repeater may be used instead. Signal light is supplied from an optical sender (OS) 34 to the optical fiber transmission line 30, and the signal light transmitted by the optical fiber transmission line 30 is received by an optical receiver (OR) 36.

According to the present invention, each optical repeater 32 can provide so-called 3R functions without the need for opto/electric conversion. The term of "3R" means Reshaping, Retiming, and Regeneration.

Figure 6:
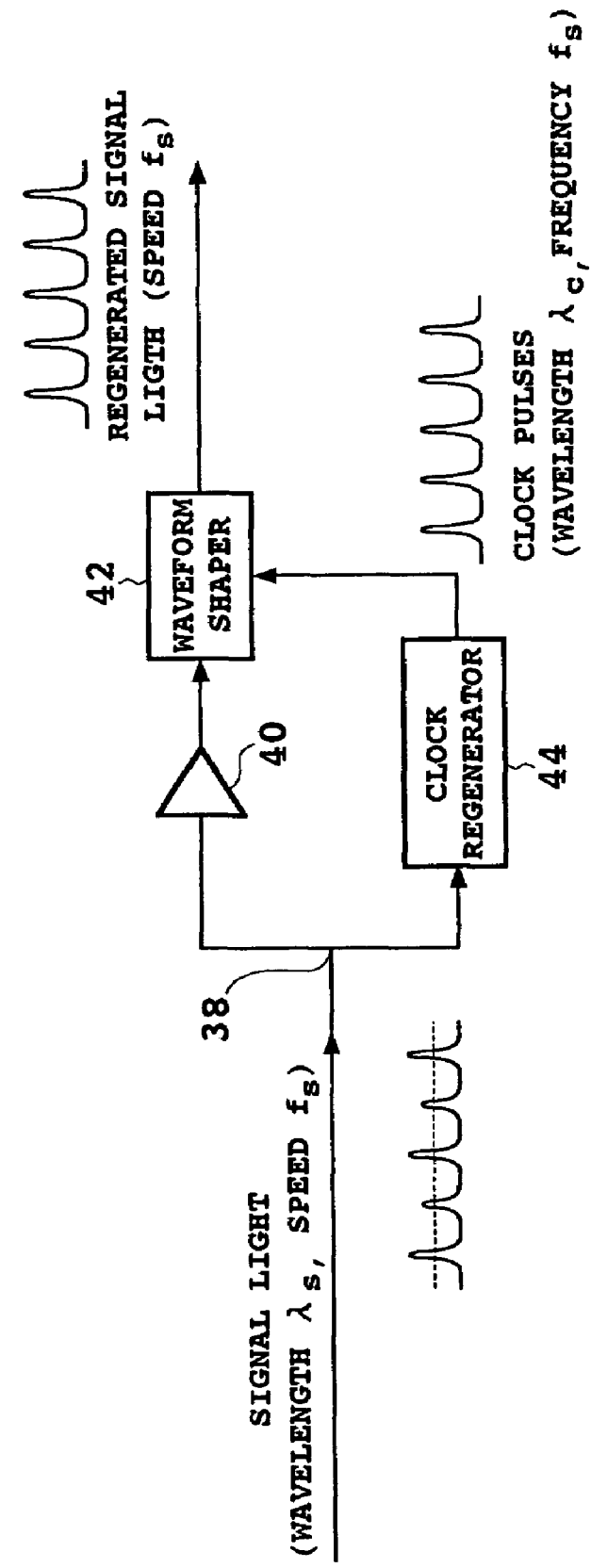
FIG. 6 is a block diagram showing a preferred embodiment of each optical repeater shown in FIG. 5.

FIG. 6 is a block diagram showing a preferred embodiment of each optical repeater 32 shown in FIG. 5. The signal light supplied is split into first and second signal lights at a splitting point 38. The splitting point 38 is provided by an optical coupler, for example. The first signal light is amplified by an optical amplifier 40 with a predetermined gain, and the amplified signal light is then supplied to a waveform shaper 42. On the other hand, the second signal light is supplied to a clock regenerator 44. The clock regenerator 44 regenerates clock pulses by the mode locking of laser oscillation by the signal light according to the present invention. The waveform shaper 42 performs waveform shaping of the signal light by AND gating of the signal light and the clock pulses regenerated by the clock regenerator 44. Regenerated signal light obtained by the waveform shaping is output from the waveform shaper 42.

More specifically, the waveform shaper 42 has a discriminating function based on optical level such that when the input signal light is composed of pulses having signal intensities higher than a given discrimination point, the pulses are determined to be on-pulses, whereas when the input signal light is composed of pulses having signal intensities lower than the discrimination point, the pulses are determined to be off-pulses. In the case of the on-pulses, the waveform shaper 42 outputs optical pulses, but in the case of the off-pulses, the waveform shaper 42 outputs no optical pulses. By performing the waveform shaping in synchronism with the regenerated clock pulses, signal regeneration based on optical level can be effected with timing being taken.

In the system shown in FIG. 5, the waveform of the signal light is distorted by dispersion and nonlinear effects in the optical fiber transmission line 30, or waveform degradation occurs because of the accumulation of ASE noise in the optical amplifiers during repeated transmission. with the configuration of each optical repeater 32 shown in FIG. 6, the 3R functions can be obtained according to the present invention. Accordingly, by repeating these functions, long-haul transmission can be effected.

While the optical amplifier 40 is provided between the splitting point 38 and the waveform shaper 42 in the preferred embodiment shown in FIG. 6, the optical amplifier 40 may be provided upstream of the splitting point 38, or inside of the waveform shaper 42, or downstream of the waveform shaper 42. The optical amplifier 40 is provided by an EDFA, for example.

Further, while the optical device according to the present invention is used as the clock regenerator 44 included in each optical repeater 32 in this preferred embodiment, the clock pulses may be regenerated at the output end of the optical fiber transmission line 30 by the optical device according to the present invention. In this case, the optical device according to the present invention is provided in the optical receiver 36, for example.

The waveform shaper 42 may be provided by a device using a saturable absorber, for example. In this case, nonlinear (saturation) effects at a rising region (low-power region) and a peak region (high-power region) of a pulse can be exhibited with respect to the power of input signal light, thereby compressing waveform distortions at these regions.

Figure 7:
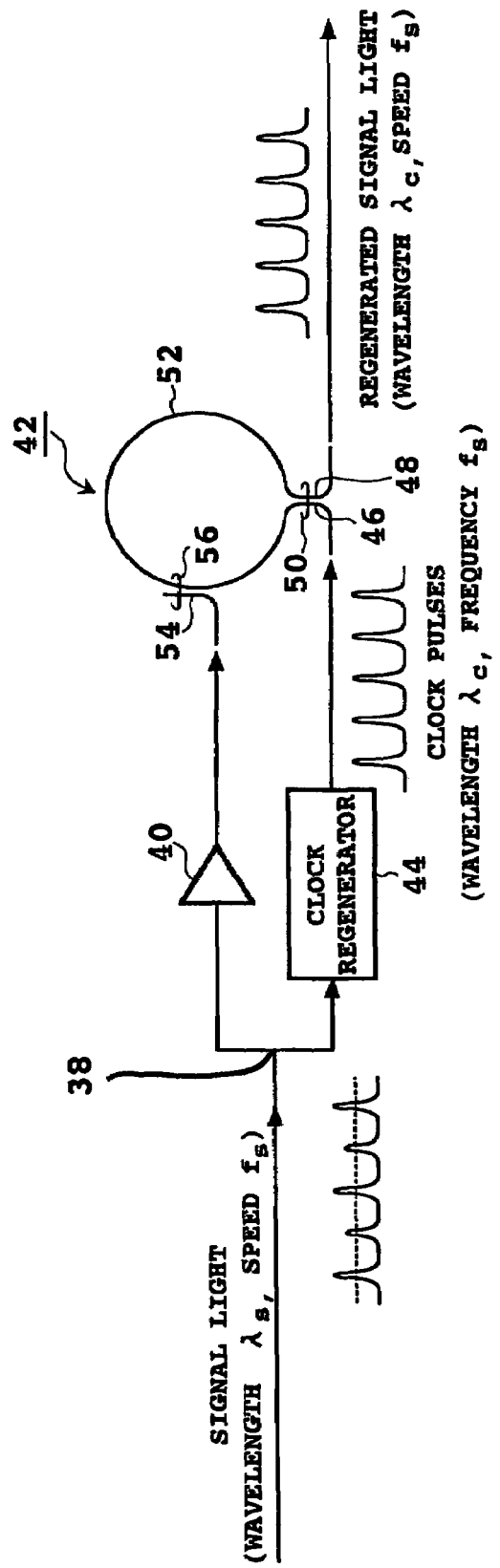
FIG. 7 is a block diagram showing a specific embodiment of the optical repeater shown in FIG. 6.

FIG. 7 is a block diagram showing a specific embodiment of the optical repeater 32 shown in FIG. 6. A nonlinear optical loop mirror (NOLM) is used as the waveform shaper 42.

More specifically, the waveform shaper 42 includes an optical coupler 50 having optical paths 46 and 48 directionally coupled to each other, a loop optical path 52 for connecting the optical paths 46 and 48, an optical coupler 56 having an optical path 54 directionally coupled to the loop optical path 52. The loop optical path 52 is provided by an HNL-DSF, for example. The optical path 46 is connected to the clock regenerator 44. The optical path 48 serves as an output port of this optical repeater 32. The optical path 54 is connected to the optical amplifier 40.

The clock pulses regenerated by the clock regenerator 44 are supplied as probe pulses to the NOLM, and the signal light amplified by the optical amplifier 40 is supplied as control pulses to the NOLM. The power $P_s$ of the input signal light is adjusted so that a difference $\Phi$ in phase shift due to cross-phase modulation (XPM) between clock pulses propagating clockwise in the loop optical path 52 and clock pulses propagating counterclockwise in the loop optical path 52 after split at the optical coupler 50 becomes about $\pi$. At this time, switching of the clock pulses occurs and the regenerated signal light subjected to waveform shaping is generated with the same wavelength as that of the clock pulses.

The dispersion of the HNL-DSF used as the loop optical path 52 is preferably set so that no walk-off of two pulses (one of the pulses of the signal light and one of the clock pulses) is generated. As an example, the zero-dispersion wavelength of the HNL-DSF is set near the middle between the wavelength of the signal light and the wavelength of the clock pulses. Alternatively, the zero-dispersion wavelength is set longer or shorter than the wavelengths of the two pulses. In the case that the zero-dispersion wavelength is set longer than the wavelengths of the two pulses, the dispersion of the HNL-DSF falls in a normal dispersive region, so that modulation instability effects can be suppressed. In the case that the zero-dispersion wavelength is set shorter than the wavelengths of the two pulses, the dispersion of the HNL-DSF falls in an anomalous dispersive region, so that solution effects can be used. How the zero-dispersion wavelength is set may be determined according to actual system conditions.

Further, an optical filter and an optical isolator may be provided upstream or downstream of the configuration shown in FIG. 7 or inside of the configuration shown in FIG. 7.

While the NOLM is used as the waveform shaper in the above preferred embodiment for illustration, an interferometer configuration in accordance with a similar principle may be used instead.

According to the present invention as described above, it is possible to provide a method, device, and system for regeneration and application of an optical clock not depending on the bit rate, pulse shape, etc. of signal light without the need for opto/electric conversion. As a result, various performance limits in the existing linear optical communication system can be broken down.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical device comprising:
an optical path provided between an input port, which is connected to a first optical fiber, and to which signal light modulated at a frequency $f_s$ is supplied, and an output port; and
an optical loop optically coupled to said optical path;
said optical loop including:
an optical amplifier for compensating for a loss in said optical loop so that laser oscillation of a continuous wave having a wavelength $\lambda_c$ occurs in said optical loop;
an adjuster for adjusting an optical path length of said optical loop so that said frequency $f_s$ becomes equal to an integral multiple of the reciprocal of a recirculation period of said optical loop;
an optical bandpass filter that allows light having said wavelength $\lambda_c$ to pass; and
a nonlinear optical medium for mode-locking said laser oscillation according to said signal light,
wherein said nonlinear optical medium includes a second optical fiber to which said signal light of said input port is inputted from said optical loop, and said continuous wave having said wavelength $\lambda_c$ is inputted from said optical loop, and generates amplitude modulated CW light having said wavelength $\lambda_c$ and including a component of said frequency $f_s$ by performing amplitude modulation of said continuous wave based on four-wave mixing by two lights between the signal light and the continuous wave generated by the laser oscillation, said signal light operating as pump light in the four-wave mixing by two lights between the signal light and the continuous wave; and
wherein pulses including said wavelength $\lambda_c$ are generated by said nonlinear optical medium and output through the output port, and a wavelength $\lambda_s$ of said signal light of said input port is different from said wavelength $\lambda_c$ of said continuous wave.

2. An optical device according to claim 1, further comprising an optical coupler for optically coupling said optical path and said optical loop, said optical coupler providing a part of said optical path and a part of said optical loop.

3. An optical device according to claim 1, wherein said nonlinear optical medium comprises a single-mode fiber.

4. An optical device according to claim 3, wherein said nonlinear optical medium has a zero dispersion wavelength substantially equal to the wavelength of said signal light.

5. An optical device according to claim 1, wherein said nonlinear optical medium comprises a highly nonlinear dispersion shifted fiber.

6. An optical device according to claim 5, wherein said nonlinear optical medium has a zero-dispersion wavelength substantially equal to the wavelength of said signal light.

7. An optical device according to claim 1, further comprising an input optical amplifier optically connected to said input port for amplifying said signal light.

8. An optical device according to claim 1, further comprising a waveform shaper optically connected to said output port for performing waveform shaping of said signal light according to an optical clock output from said output port.

9. An optical device according to claim 8, wherein said waveform shaper comprises a nonlinear optical loop mirror.

10. An optical device according to claim 1, wherein said second optical fiber comprises a highly-nonlinear dispersion shifted fiber, and a nonlinear refractive index of said second optical fiber is equal to or larger than $5 \times 10^{-20}$ m$^2$/W.

11. An optical device according to claim 1, wherein said second optical fiber comprises a highly-nonlinear dispersion shifted fiber, and a mode field diameter of said second optical fiber corresponding to an effective core area is equal to or less than 4 µm.

12. An optical device according to claim 1, wherein said second optical fiber comprises a plurality of small sections, said plurality of said small sections being connected in such an order that adjacent small sections have similar zero-dispersion wavelengths, each small section having a length which is hundreds of meters or less.

13. An optical device according to claim 12, wherein fiber sections among said plurality of said small sections have a smaller variation in zero-dispersion wavelength near an end of said second optical fiber, to which end said signal light is input.

14. An optical device according to claim 1, wherein said signal light of said input port is frequency-modulated or phase modulated at a frequency sufficiently lower than a bit rate of the signal light, to suppress a stimulated Brillouin scattering (SBS) due to signal light power.

15. A system comprising:
a first optical fiber for transmitting signal light modulated at a frequency $f_s$; and
an optical device connected to said first optical fiber;
said optical device including:
an optical path provided between an input port, which is connected to said first optical fiber, and to which said signal light is supplied, and an output port;
an optical loop optically coupled to said optical path;
said optical loop including:
an optical amplifier for compensating for a loss in said optical loop so that laser oscillation of a continuous wave having a wavelength $\lambda_c$ occurs in said optical loop;
an adjuster for adjusting the optical path length of said optical loop so that said frequency $f_s$ becomes equal to an integral multiple of the reciprocal of a recirculation period of said optical loop;
an optical bandpass filter that allows light having said wavelength $\lambda_c$ to pass; and
a nonlinear optical medium for mode-locking said laser oscillation according to said signal light,
wherein said nonlinear optical medium includes a second optical fiber to which said signal light of said input port is inputted from said optical loop, and said continuous wave having said wavelength $\lambda_c$ is input from said optical loop, and generates amplitude modulated CW light having said wavelength $\lambda_c$ and including a component of said frequency $f_s$ by performing amplitude modulation of said continuous wave based on four-wave mixing by two lights between the signal light and the continuous wave generated by the laser oscillation, said signal light operating as pump light in the four-wave mixing by two lights between the signal light and the continuous wave; and wherein pulses including said wavelength $\lambda_c$ are generated by said nonlinear optical medium and output through the output port, and a wavelength $\lambda_s$ of said signal light of said input port is different from said wavelength $\lambda_c$ of said continuous wave.

16. A system according to claim 15, wherein said second optical fiber comprises a plurality of small sections, said plurality of said small sections being connected in such an order that adjacent small sections have similar zero-dispersion wavelengths, each small section having a length which is hundreds of meters or less.

17. A system according to claim 16, wherein fiber sections among said plurality of said small sections have a smaller variation in zero-dispersion wavelength near an end of said second optical fiber, to which end said signal light is input.

18. A system according to claim 15, wherein said signal light of said input port is frequency-modulated or phase modulated at a frequency sufficiently lower than a bit rate of the signal light, to suppress a stimulated Brillouin scattering (SBS) due to signal light power.

19. A system comprising:
a first optical fiber transmission line for transmitting signal light; and
at least one optical repeater arranged along said optical fiber transmission line;
each of said at least one optical repeater including:
an optical clock regenerator for regenerating an optical clock by mode locking of laser oscillation according to said signal light; and
a waveform shaper for performing waveform shaping of said signal light according to said optical clock regenerated by said optical clock regenerator,
said optical clock regenerator including:
an optical path provided between an input port, which is connected to said first optical fiber, and to which signal light modulated at a frequency $f_s$ is supplied, and an output port; and
an optical loop optically coupled to said optical path;
said optical loop including:
an optical amplifier for compensating for a loss in said optical loop so that laser oscillation of a continuous wave having a wavelength $\lambda_c$ occurs in said optical loop:
an adjuster for adjusting an optical path length of said optical loop so that said frequency $f_s$ becomes equal to an integral multiple of the reciprocal of a recirculation period of said optical loop;
an optical bandpass filter that allows light having said wavelength $\lambda_c$ to pass; and
a nonlinear optical medium for mode-locking said laser oscillation according to said signal light,
wherein said nonlinear optical medium includes a second optical fiber to which said signal light of said input port is inputted from said optical loop, and said continuous wave having said wavelength $\lambda_c$ is inputted from said optical loop, and generates amplitude modulated CW light having said wavelength $\lambda_c$ and including a component of said frequency $f_s$ by performing amplitude modulation of said continuous wave based on four-wave mixing by two lights between the signal light and the continuous wave generated by the laser oscillation, said signal light operating as pump light in the four-wave mixing by two lights between the signal light and the continuous wave; and wherein pulses including said wavelength $\lambda_c$ are generated by said nonlinear optical medium and output through the output port, and a wavelength $\lambda_s$ of said signal light of said input port is different from said wavelength $\lambda_c$ of said continuous wave.

20. A system according to claim 19, wherein said waveform shaper comprises a nonlinear optical loop mirror.

21. A system according to claim 19, wherein said second optical fiber comprises a plurality of small sections, said plurality of said small sections being connected in such an order that adjacent small sections have similar zero-dispersion wavelengths, each small section having a length which is hundreds of meters or less.

22. A system according to claim 21, wherein fiber sections among said plurality of said small sections have a smaller variation in zero-dispersion wavelength near an end of said second optical fiber, to which end said signal light is input.

23. A system according to claim 19, wherein said signal light of said input port is frequency-modulated or phase modulated at a frequency sufficiently lower than a bit rate of the signal light, to suppress a stimulated Brillouin scattering (SBS) due to signal light power.

24. A method comprising:
(a) generating laser oscillation of a continuous wave having a wavelength $\lambda_c$ in an optical loop including as a nonlinear optical medium;
(b) introducing a signal light modulated at a frequency $f_s$ into said optical loop from a first optical fiber;
(c) adjusting the optical path length of said optical loop so that said frequency $f_s$ becomes equal to an integral multiple of the reciprocal of a recirculation period of said optical loop;
(d) regenerating an optical clock by mode-locking said laser oscillation according to said signal light; and
(e) allowing light of said wavelength $\lambda_c$ to pass;
wherein said step (d) generates amplitude modulated CW light having said wavelength $\lambda_c$ and including a component of said frequency $f_s$ by performing amplitude modulation of said continuous was based on four wave mixing by two lights between the signal light and the continuous wave generated by the laser oscillation, said signal light operating as pump light in the four-wave mixing by two lights between the signal light and the continuous wave; and wherein pulses including said wavelength $\lambda_c$ are generated by said nonlinear optical medium and output through the output port, and a wavelength $\lambda_s$ of said signal light of said input port is different from said wavelength $\lambda_c$ of said continuous wave.

25. A method according to claim 24, wherein said nonlinear optical medium includes an optical fiber to which said signal light is inputted from said optical loop, and said optical fiber optical fiber comprises a plurality of sections, said plurality of said sections being connected in such an order that adjacent sections have similar zero-dispersion wavelengths, each section having a length which is hundreds of meters or less.

26. A method according to claim 25, wherein fiber sections among said plurality of said small sections have a smaller variation in zero-dispersion wavelength near an end of said optical fiber, to which end said signal light is input.

27. A method according to claim 24, wherein said signal light of said input port is frequency-modulated or phase modulated at a frequency sufficiently lower than a bit rate of the signal light, to suppress a stimulated Brillouin scattering (SBS) due to signal light power.

* * * * *

UNITED STATES PATENT AND TRADEMARK OFFICE
CERTIFICATE OF CORRECTION

PATENT NO. : 7,561,811 B1
APPLICATION NO. : 09/560723
DATED : July 14, 2009
INVENTOR(S) : Shigeki Watanabe Page 1 of 1

It is certified that error appears in the above-identified patent and that said Letters Patent is hereby corrected as shown below:

Column 12, Line 38, change "was" to --wave--.

Column 12, Line 51, after "fiber" delete "optical fiber".

Signed and Sealed this

Seventeenth Day of November, 2009

David J. Kappos
*Director of the United States Patent and Trademark Office*